United States Patent [19]

Larson et al.

[11] 4,450,177

[45] * May 22, 1984

[54] METHOD OF PRODUCING FROZEN YEAST-LEAVENED DOUGH

[75] Inventors: Robert W. Larson, Croton-on-Hudson; Wen C. Lou, Yorktown Heights; Vivian C. DeVito, Tuckahoe; Karen A. Neidinger, Ossining, all of N.Y.

[73] Assignee: General Foods Corporation, White Plains, N.Y.

[*] Notice: The portion of the term of this patent subsequent to Sep. 27, 2000 has been disclaimed.

[21] Appl. No.: 535,978

[22] Filed: Sep. 26, 1983

Related U.S. Application Data

[63] Continuation of Ser. No. 248,147, Apr. 30, 1981, Pat. No. 4,406,911, which is a continuation of Ser. No. 164,374, Jun. 30, 1980, abandoned, which is a continuation-in-part of Ser. No. 953,807, Oct. 23, 1978, abandoned.

[30] Foreign Application Priority Data

Oct. 19, 1979 [CA] Canada .................................. 338082

[51] Int. Cl.$^3$ ............................................... A21D 8/00
[52] U.S. Cl. .................................... 426/19; 426/524; 426/656
[58] Field of Search ............... 426/19, 326, 393, 549, 426/524, 653, 656, 658

[56] References Cited

U.S. PATENT DOCUMENTS 4,406,911  9/1983  Larson et al. ...................... 426/19

*Primary Examiner*—Michael S. Marcus
*Assistant Examiner*—Elizabeth A. Hatcher
*Attorney, Agent, or Firm*—Thomas R. Savoie; Daniel J. Donovan

[57] ABSTRACT

A frozen bread dough which can be prepared from the freezer to a finished baked loaf within about one hour has been accomplished by using a novel process. Because the bread dough is yeast leavened, desirous yeast-leavened flavor and aroma is obtainable. The dough maintains its shelf-life stability through the addition of hydrophilic colloids, film-forming proteins and surfactants.

4 Claims, No Drawings

METHOD OF PRODUCING FROZEN YEAST-LEAVENED DOUGH

CROSS REFERENCE TO RELATED APPLICATION

This is a continuation of copending application Ser. No. 248,147 filed Apr. 30, 1981 now U.S. Pat. No. 4,406,911 dated Sept. 27, 1983, which was in turn a continuation of Ser. No. 164,374 filed June 30, 1980, now abandoned, which in turn was a continuation-in-part of Ser. No. 953,807 filed Oct. 23, 1978 also now abandoned.

BACKGROUND OF THE INVENTION

The present invention relates to a method of producing dough, and more particularly, the present invention is concerned with producing dough which can be proofed, frozen, stored for periods of time in frozen condition and thereafter subjected to baking without the traditional thawing or proofing procedure.

Freezing of baking doughs for distribution has widely come into effect in the U.S. and other countries and has become more and more important with expansion of freezing-distribution mechanisms. The breadmaking process using frozen dough, however, has several serious problems to be solved. Among them are the length of time in preparation before baking and the reduction in stability of the dough after freezing and thawing. Heretofore, it was believed that the reduction in the stability of the dough was due to the reduction in yeast activity and the associated degradation of the dough which are in turn considered to be caused by leakage of reducing substances (predominantly glutathione) from damaged yeast cells. Various attempts have been made in practice to solve the problem, (for example, the use of a larger amount of yeast or the use of a slightly larger quantity of potassium bromate), but all of them are unsatisfactory.

Among various kinds of breads, those of lean formulae, such as white bread, are generally susceptible to significant degradation and thus few of them are actually circulated as frozen doughs. The prolonged frozen storage of lean formula frozen dough gives rise to a reduction in the volume of the baked bread and a deterioration in the quality thereof (coarse skin, crumb, etc.) so that the bread has a quality which is not acceptable for a commercial product.

From these viewpoints, various techniques, including a decrease in fermentation time before freezing, an increase in quantity of yeast used and the addition of KBrO$_3$, have been proposed, but none of them are, in effect, satisfactory.

SUMMARY OF THE INVENTION

The object of this invention is to provide a bread in frozen dough form that can be conveniently prepared from the freezer to a finished baked loaf within about one hour. Another object of this invention is to provide a dough composition, which when made according to present method, is capable of sustaining prolonged periods of freezing and still produce a good quality loaf of baked bread. A feature of the invention is its ability to produce typical "home-made bread" aroma and good bread texture.

The method of producing the frozen bread dough composition comprises the following steps: formulation, mixing, fermenting, forming, resting, packaging, freezing, storing in refrigeration (below 0° C.). By using this method, bread can be removed from frozen storage and immediately baked without the traditional thawing or proofing.

The bread dough composition is comprised of flour, water, sugar, yeast, salt, non-fat dry milk, shortening, gums, protein film formers, and surface active agents. The ingredients and processing conditions described herein, result in a proofed, frozen dough that is not sensitive to changes during frozen storage. The frozen dough of this invention can be placed in oven while in the frozen state and baked to provide a fresh, hot bread texture and flavor within about one hour's time after removal from the freezer.

Other objects, features and advantages of this invention will be apparent from the following detailed description and appended claims.

DESCRIPTION OF THE PREFERRED EMBODIMENTS

As employed herein, the term "fermentation" is meant to include all changes in the dough brought about by the action of yeast which functions to aerate a dough and ripen the gluten. Total fermentation time includes the time elapsed during fermentation of the dough in bulk, resting or benching and proofing. For the sake of clarity, traditional baking terminology is defined below and employed when appropriate to identify the specific dough treatment steps during which fermentation occurs.

"Fermentation in bulk" occurs after the dough formulation is mixed and allowed to stand before it is divided into separate portions.

"Resting" is used interchangeably with "benching" to denote periods of time allowed to give the gluten of the flour time to recover from any step such as dividing, molding, forming, etc. wherein the dough has been stretched or worked. Without these rest periods, the dough is usually sticky and difficult to handle.

"Proofing" is the final step before baking or freezing wherein time is allowed for the yeast to produce more gas to give the correct volume and vesiculation to the molded or shaped dough portion.

Hitherto, frozen doughs have been generally prepared according to the straight down method or the sponge dough method which require thawing and proofing of the frozen loaf before baking.

The straight dough method comprises the following steps: formulation, mixing, prefermentation, punching, division, rounding, benching, moulding, freezing, storage in refrigeration, thawing and proofing, and baking. The sponge dough method comprises the following steps: preliminary formulation, mixing, prefermentation, formulation, mixing, fermentation, division, rounding, benching, moulding, freezing, storage in refrigeration, thawing and proofing, and baking. In the above straight or sponge dough methods, a frozen dough, particularly for bread, tends to be of reduced quality after thawing and baking. To eliminate this tendency, a new process for preparing such dough has been developed.

Hitherto, frozen dough ingredients have not included a combination gums, protein film formers and surface active agents with the usual dough ingredients.

The novel frozen dough composition of this invention includes the usual frozen dough ingredients such as flour, water, yeast, sugar, salt, non-fat dry milk and shortening in proportions preferred by the baker, mixed with gums, surfactants, and film forming proteins. Thus, a yeast-leavened dough is prepared rather than a chemically-leavened dough, and one is able to obtain both a yeast-leavened flavor and aroma upon baking.

Gums (as defined in the Handbook of Food Additives, Second Edition, CRC Press, 1972, which is herein incorporated by reference) have long served as thickeners or suspenders in foods, as well as stabilizers and emulsifiers. With the addition of gums to flour, the time for dough development is to be increased, mostly because of competition for the water and time necessary for hydration of the hydrophilic colloid. Although dough stability increases when hydrophilic colloids are added to the flour, the quality of breads produced is reduced. However, when the stability attribute of the hydrophilic colloid is combined with the remaining components of the present invention, an acceptable loaf volume is produced even after several weeks of freezer storage. The expected range of gum to be used for frozen bread dough would be 0.03 to 6.0% flour basis. Gums such as xanthan, tragacanth, guar, carrageenan, carboxymethylcellulose, and others have proven to be effective gums.

Surfactants have several known effects in dough which are covered by the term "dough conditioning." Nearly all of these effects involve some type of protein-surfactant interaction. At low concentrations, surfactants act as wetting agents and facilitate flour hydration and initial dough development. Surfactants present above their critical micelle concentration in dough exist as micelles and other condensed phases, and when these are interposed between protein molecules, they modify protein-protein interactions and enhance the shearing effects of mixing. However, the benefits of the surfactants when combined with the other ingredients of the dough appears to produce a stronger interreaction among the protein-protein and protein-starches bond which adds to the retention of the fermented dough structure. Dough structure is sought to be maintained in its original fermented state in order that carbon dioxide losses can be minimized. The expected range of surfactants to be used for the frozen bread dough would be 0.20 to 1.5% flour basis. Surfactants such as hydroxylated lecithin, mono- and diglycerides of fat-forming fatty acids, diacetyl tartaric acid esters of mono- and diglycerides of fat-forming fatty acids, calcium stearoyl-2-lactylate, ethoxylated mono and diglycerides, succinylated monoglycerides, and others, have proven to be effective surface active agents.

Protein film formers, i.e., dough strengtheners, have long been used in the bread industry for dough structure building purposes. The mechanism by which this is accomplished appears to be that proteinaceous films combine with the gluten and starch granules. This film is formed around gas bubbles generated by fermentation. In the present invention, the protein film formers combine with the surfactant and gluten to reduce the mobility and the repulsion of the starch granules in the proteinaceous films adding to the retention of the generated gas. The expected range of protein film formers to be used for frozen bread dough would be 0.3 to 3.3% flour basis. Protein film formers such as vital gluten, egg albumen, beef albumen and selected legume protein isolates, milk proteins, soya milk, legume protein isolates, cereal grain protein isolates, as well as others, have all proven effective ingredients.

Hitherto, the state of the art teaches that dough fermentation before freezing is suppressed to preserve the yeast activity for the usual thawing and proofing steps which usually require 2–12 hours for thawing and 2–4 hours for proofing. For this reason, ingredients are usually cooled to a temperature of 2′ C. to 20° C. before mixing. This cooling suppresses the fermentation activity of the yeast and the subsequent degradation of the latter by freezing is inhibited.

Contrary to the teachings of the prior art, mixing of the ingredients used in this invention may be performed in ambient temperature rather than the chilled conditions. By mixing under these conditions, yeast activity is not suppressed, but rather fermentation occurs at a slow and controlled rate. The process of this invention is characterized by the degree of fermentation of yeast which has been demonstrated to depend upon time and temperature.

Depending upon the yeast employed, fermentation usually occurs at a temperature of about 30° C. However, in the present invention, the ingredients are mixed under ambient conditions which are usually lower than normal fermentation temperatures. Optimally, the temperature should range between 20° C. and 30° C. so as to obtain a slow and controlled rate of fermentation. If temperatures above 30° C. are utilized, the dough structure may expand too much and weaken. Those skilled in the art will readily appreciate that fermentation occurs as a function of time and temperature. In the present dough formulation, total fermentation time, before freezing, is usually for from 1.0 to 2.0 hours, preferably about 1.5 hours. Fermentation of the dough of this invention occurs at separate intervals of time; first in bulk and subsequently with the dough in divided portions. The fermentation periods comprise one or more short intervals of at least five minutes duration with the dough in bulk or in divided portions and one longer interval of about 45 minutes duration; however, the total fermentation time does not exceed two hours. Fermentation times and temperatures are limited so that the dough is not sensitive to changes during frozen storage. It is also important to have the proper dough rheological characteristics to obtain a high quality bread. Because the yeast, yeast by-products and flour enzymes are important factors in obtaining the proper rheology, fermentation time must be controlled. However, those skilled in the art will also appreciate that different types of strains of yeast will dictate different times and temperatures to be used in fermentation.

After fermentation in bulk has taken place, conventional steps are employed in forming the dough into bread loaf configurations. Those skilled in the art will recognize that these steps usually consist of dividing, rounding, benching, moulding and proofing of the bread dough.

At this point in the process, the formed loaf is allowed to proof for a period of time to rise to a given height. The proofing period allows the loaf to generate additional carbon dioxide so that when it goes into an oven it will spring up. This proofing period is essential because the loss of carbon dioxide which occurs during dividing and formation must be regenerated. During this period, the gluten relaxes and the dough piece conforms to the shape of the container. The overall objective of the final proofing period is to allow each 454-gram loaf to attain a volume of between 1.76 cc–3.08 cc/g dough, preferably 1.98 cc to 2.86 cc/g dough, before freezing.

The volume of the fermented dough, before freezing, has a direct correlation to the volume of the finished baked loaf which has been taken directly from the freezer and placed in a cold oven which gradually heats up to the preferred baking temperature. The increase in volume from frozen loaf to baked loaf is called "oven spring," which can be positive or negative. When the fermented loaf, prior to freezing, is from 1.76 cc–2.64 cc/g, a positive oven spring results. When the fermented loaf is greater than 2.64 cc/g, a positive but decreasing oven spring results. When the load volume, before freezing, exceeds 3.08 cc/g, negative oven spring results, i.e., the bread does not rise in the oven. Thus, after forming each portion of fermented dough and proofing to allow additional fermentation, before freezing, the proofing time should be sufficient for each portion of dough to attain a specific volume of from about 1.76 cc/g to about 3.08 cc/g to obtain a desirable baked bread which rises in the oven.

If the fermentation period is very long in time, the dough probably expands too much and weakens the dough structure. Another problem with extended fermentation periods is that the surface of the dough will be subject to an evaporation or dessication phenomena. Consequently, a thin surface layer would be formed on the dough body which has a lower water content than the body of dough underneath the surface layer. This surface layer forms a coherent skin covering the dough body which in turn produces textural and color abberations not desired in a final baked bread. One method to retain the desired moisture content and prevent dessication of the dough is to package the dough immediately after the final proofing period. Another method is to package the dough immediately before the final proofing period and allow such period to occur while the dough is in the package. If one proceeded by the latter method, more energy would be required to freeze the dough within the package.

On a total weight basis, the moisture content of the dough will range between 39.1% and 46.1% and, more preferably, between 40.0% and 41.0%. Therefore, in addition to the normal moisture content of the dough ingredients, a sufficient quantity of water is added, usually from 30% to about 37%, based on total weight of ingredients. If the dough contains moisture greater than the amount specified above, it will become difficult to handle. If the moisture content is too low, the dough becomes so stiff and nonextendable that the proper oven spring and rise do not occur.

If the dough is going to be frozen for only a few days, the mode of freezing is not critical. However, for the dough to have prolonged stability, it should be frozen such that the core temperature of it reaches −1.0° C. to −25.0° C. and, more preferably, −6.0° C. to −25.0° C. within 1 to 6 hours and, more preferably, between 1½ and 4 hours. When freezing the dough, a uniform cooling rate throughout the dough is desirable. For prolonged stability, the frozen dough should be stored at a temperature within the range of −30.0° C. to −10.0° C. and, more preferably, −15.0° C. to −25.0° C.

During the baking process, the dough expands to give a normal loaf volume. The expansion can be 1½ times its original volume. This physical occurrence provides a sense of baking from "scratch" rather than just rewarming a previously baked product. This sense of accomplishment is further enhanced by the fresh-baked aroma of yeast-leavened bread which is given off.

The present invention is further illustrated, but in no way limited by the following examples.

EXAMPLE 1

Frozen Dough Stored 4 Weeks

A dough formulation of the following composition was prepared:

| Ingredient | % By Wt. | % Flour Basis |
|---|---|---|
| Enriched Wheat Flour (Bleached, Bromated) | 47.43 | 100.00 |
| Water | 36.72 | 72.42 |
| Sugar (Sucrose) | 5.84 | 12.31 |
| Shortening (Soybean Oil with Ethoxylated Monoglycerides and Mono and Diglycerides) | 2.96 | 6.24 |
| Active Dry Yeast | 2.36 | 4.98 |
| Nonfat Dry Milk | 1.78 | 3.75 |
| Salt | 1.19 | 2.51 |
| Sodium Caseinate | .47 | .99 |
| Yeast Nutrients | .30 | .63 |
| Sodium Stearoyl-2-Lactylate | .30 | .63 |
| Egg White Solids | .25 | .53 |
| Carboxymethylcellulose | .20 | .42 |
| Xanthan Gum | .20 | .42 |

Mixing was accomplished in a usual manner. Fermentation lasted approximately 90 minutes at 25.0° C. Thereafter, the dough was formed onto 454-gram loaves and allowed to rest for 10 minutes. The dough was then packaged and frozen by a normal air-blast method. The frozen, packaged dough was stored at −15.0° C. for a period of one to four weeks. The results obtained for each 454-gram loaf of dough are as follows:

| | Storage at −15.0° C. | | | |
|---|---|---|---|---|
| Loaf Number | A | B | C | D |
| Storage Period (Days) | 1 | 7 | 14 | 27 |
| Volume of Baked Bread (cc) | 1625 | 1675 | 1600 | 1575 |

The frozen dough loaf was taken from the freezer and immediately placed in a cold oven which was immediately turned on and allowed to heat to a temperature of 175.0° C. Each loaf was baked for 60 minutes. The textural and taste characteristics of the bread were comparable to bread made in the traditional manner at home.

EXAMPLE 2

Frozen Dough Stored 8 Weeks

A dough formulation of the following composition was prepared:

| Ingredient | % By Wt. | % Flour Basis |
|---|---|---|
| Enriched Wheat Flour (Bleached, Bromated) | 25.75 | |
| High Gluten Flour | 25.75 | 100.00 |
| Water (43.3° C.) | 33.63 | 65.31 |
| Egg White (liquid) | 4.72 | 9.17 |
| Big 7 Premix* | 3.60 | 7.00 |
| Shortening (Soybean Oil with Ethoxylated Monoglycerides and alpha-monoglycerides) | 2.03 | 3.95 |
| Sugar (Sucrose) | 1.63 | 2.82 |

-continued

| Ingredient | % By Wt. | % Flour Basis |
|---|---|---|
| Activated Dry Yeast (ADY) | 1.18 | 2.29 |
| Nonfat Dry Milk | 1.03 | 2.01 |
| Salt | 0.36 | 0.70 |
| Diacetyl Tartaric Acid Esters of Mono and Diglycerides (emulsifier) | 0.13 | 0.25 |
| Potassium Bromate (KBrO$_3$) | 0.10 | 0.21 |
| Xanthan Gum | 0.04 | 0.07 |
| L-cystine | 0.04 | 0.07 |
| TOTAL | 99.99 | |

*Big 7 Premix is manufactured by the Caravan Company, Totowa, New Jersey. It is a mix commonly used in yeast-leavened products and comprises sugar, salt, shortening, corn sugar, soy flour, cornstarch, mono- and diglycerides, potassium bromate, ascorbic acid, L-cystine and fungal protease.

Mixing was accomplished in a usual manner. Fermentation of the bulk dough was for 15 minutes at 27.0° C. Thereafter, the dough was divided, rounded and formed into 454 g portions with rest steps of between 5 and 15 minutes after handling. After forming, the double was allowed to ferment for approximately 45 minutes until each 454 g loaf attained a volume greater than 800 cc. The dough was packaged and frozen as described in Example 1. The frozen, packaged dough of this example was stored at −15.0° C. for various periods of from one to eight weeks. The results obtained for each 454-gram loaf of dough are as follows:

| | Storage at −15.0° C. | | | |
|---|---|---|---|---|
| Loaf No. | E | F | G | H |
| Storage Period (Days) | 1 | 14 | 27 | 55 |
| Volume of Baked Bread (cc) | 1800 | 1650 | 1725 | 1600 |

Each frozen dough loaf above, having a volume of 875 cc, 900 cc, 825 cc and 800 cc, respectively, before baking was taken from the freezer and immediately placed in a cold oven which was immediately turned on and allowed to heat to a temperature of 175.0° C. After baking for one hour, the loaf volume shown in the above table was achieved. An oven spring (i.e., increase in volume of frozen loaf to baked loaf) of 925 cc, 750 cc, 900 cc and 800 cc, respectively, was achieved for loaves E, F, G and H. It is significant that after eight weeks of frozen storage, the dough of this invention could be taken from freezer to oven without thawing and proofing, and the baked volume was twice that of the frozen loaf.

Evaluations of bread quality are given in Example 3 below.

EXAMPLE 3

Baked Bread Texture and Flavor Evaluations

A 454-gram, frozen loaf from Example 1 and another from Example 2 were each stored at −15.0° C. for five days and baked as described in Example 1. The loaf prepared according to Example 1 had a volume of 960 cc before baking, 1710 cc after baking and an oven spring of 750 cc. Comparable data for the Example 2 loaf was 950 cc before baking, 1690 cc after baking and oven spring of 740 cc. Both loaves had a good appearance, aroma and flavor; the baked bread formulation of Example 2 had a better crust color, grain and texture.

Both formulations are deemed to produce a commercially-acceptable product which can be baked while frozen to provide a fresh, hot-bread texture and flavor within one hour's time after removal from the freezer.

We claim:

1. A method for producing a frozen, proofed yeast-leavened dough which can be placed in an oven in the frozen state and fully baked within about one hour's time after removal from the freezer comprising the steps of:
   (a) formulating and mixing a yeast-containing dough under ambient temperature;
   (b) fermenting the resultant dough for a period of at least five minutes at a temperature between 20° C. and 30° C.;
   (c) dividing the fermented dough into separate portions;
   (d) forming the fermented dough portions in a desired shape;
   (e) permitting the formed dough pieces to proof such that additional carbon dioxide is generated by the yeast;
   (f) freezing the proofed dough pieces to a core temperature of between −1° C. to −25° C. and, thereafter;
   (g) storing the frozen dough at a temperature of from −30° C. to −10° C.

2. The method of claim 1 wherein the freezing of the proofed dough pieces is effected such that a uniform cooling rate throughout the dough is obtained.

3. The method of claim 1 wherein the frozen dough of step (g) is removed from frozen storage and fully baked without an intervening proofing step.

4. The method of claim 3 wherein the frozen dough is fully baked within about one hour after removal from frozen storage.

* * * * *